(12) United States Patent
Poulakis

(10) Patent No.: US 8,011,626 B2
(45) Date of Patent: Sep. 6, 2011

(54) FIXING SYSTEM AND FASTENING ELEMENT WHICH CAN BE USED THEREFOR

(75) Inventor: Konstantinos Poulakis, Hildrizhausen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 119 days.

(21) Appl. No.: 12/309,357

(22) PCT Filed: May 8, 2007

(86) PCT No.: PCT/EP2007/004048
§ 371 (c)(1),
(2), (4) Date: Jan. 15, 2009

(87) PCT Pub. No.: WO2008/022661
PCT Pub. Date: Feb. 28, 2008

(65) Prior Publication Data
US 2009/0318016 A1    Dec. 24, 2009

(30) Foreign Application Priority Data
Aug. 23, 2006  (DE) .................. 10 2006 039 579

(51) Int. Cl.
*A44B 13/00*  (2006.01)
(52) U.S. Cl. ................... 248/205.3; 248/205.2
(58) Field of Classification Search ............. 248/205.3, 248/205.4, 62, 67.7, 74.1, 74.2, 74.3, 205.2; 428/100, 120, 192; 24/304, 306, 442; 439/534
See application file for complete search history.

(56) References Cited

U.S. PATENT DOCUMENTS

| | | | |
|---|---|---|---|
| 4,429,348 A | | 1/1984 | Dean |
| 4,660,790 A | * | 4/1987 | Muz .............................. 248/68.1 |
| 4,706,914 A | * | 11/1987 | Ground ........................ 248/74.3 |
| 4,931,344 A | | 6/1990 | Ogawa et al. |
| 6,254,304 B1 | * | 7/2001 | Takizawa et al. ............. 403/363 |
| 2002/0060275 A1 | * | 5/2002 | Polad ............................ 248/74.3 |
| 2002/0145089 A1 | * | 10/2002 | Calkins ...................... 248/205.3 |
| 2006/0006292 A1 | * | 1/2006 | Kleeb et al. ................... 248/74.1 |
| 2009/0100648 A1 | * | 4/2009 | Naftalin et al. ................. 24/306 |
| 2009/0106954 A1 | * | 4/2009 | Brockman ..................... 24/442 |
| 2009/0276986 A1 | * | 11/2009 | Janzen ............................ 24/442 |

FOREIGN PATENT DOCUMENTS

| | | |
|---|---|---|
| DE | 2 300 986 A1 | 7/1974 |
| DE | 31 07 557 A1 | 9/1982 |
| DE | 10 2004 039 765 A1 | 3/2006 |
| EP | 0 813 277 A2 | 12/1997 |

(Continued)

*Primary Examiner* — Ramon Ramirez
(74) *Attorney, Agent, or Firm* — Roylance, Abrams, Berdo & Goodman, LLP

(57) ABSTRACT

A fixing system for electronic and/or electric components—called E components in short—such as chips, circuits, transponders, cables (10) etc., has at least one first fastening element (12) having individual closure parts (14, 16) which, in interaction with corresponding closure parts (22) of a further fastening element (20), form an adhesive closure which can be opened and closed repeatedly. The respective E component can be connected to a support (30). The further fastening element (20) can be connected to the support (30), at least part of which has an adhesive layer and/or which is composed of an embedding compound. The adhesive layer or embedding compound produces the direct connection of the respective E component to the further fastening element (20) assignable to it. This connection requires only a very little amount of installation space.

23 Claims, 3 Drawing Sheets

FOREIGN PATENT DOCUMENTS

| | | |
|---|---|---|
| EP | 1 287 757 A2 | 3/2003 |
| FR | 2 116 704 A | 7/1972 |
| FR | 2 545 662 A1 | 11/1984 |
| GB | 2 040 544 A | 8/1980 |
| WO | WO 03/002377 A2 | 1/2003 |

* cited by examiner

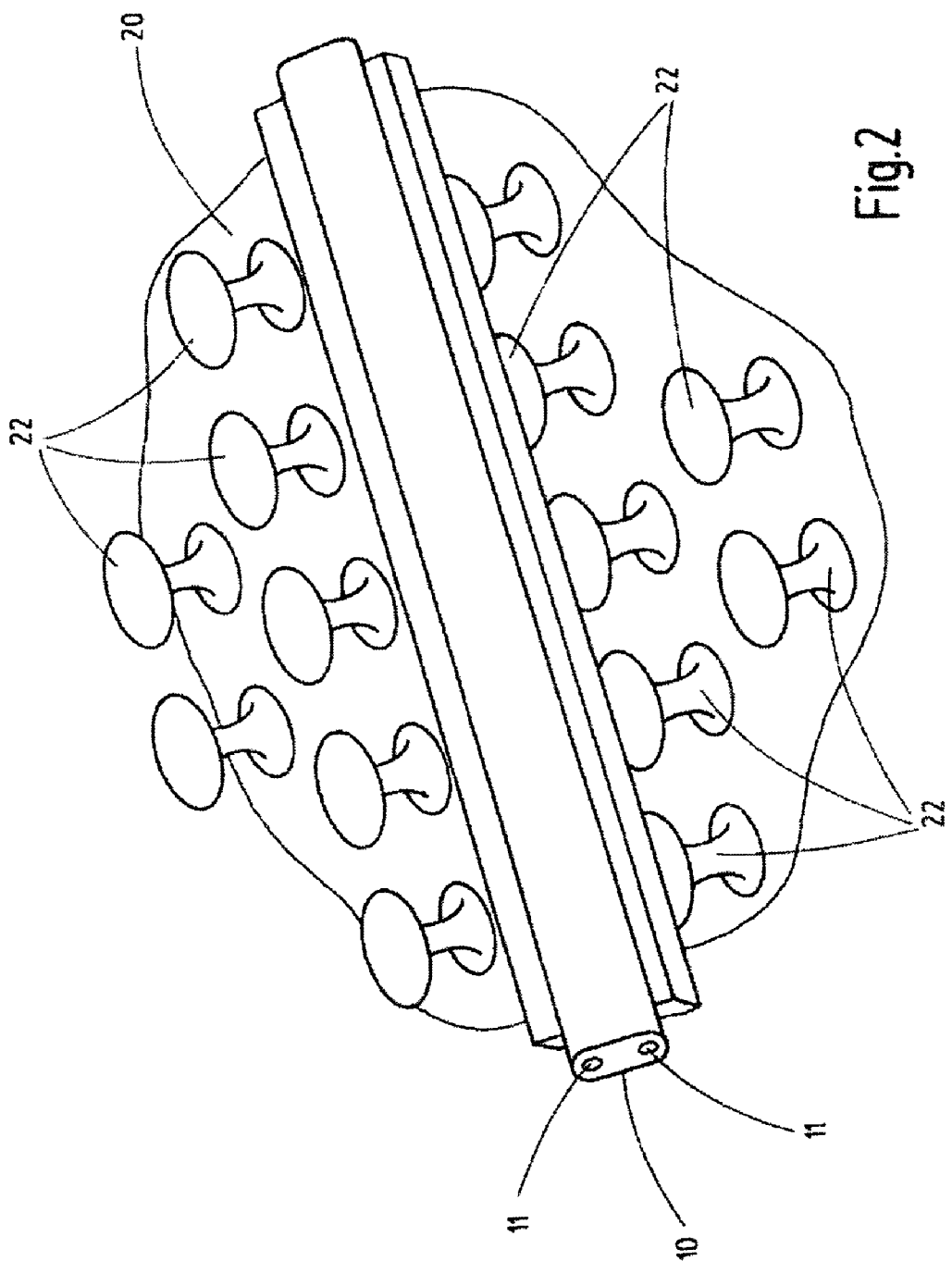

FIXING SYSTEM AND FASTENING ELEMENT WHICH CAN BE USED THEREFOR

FIELD OF THE INVENTION

The invention relates to a fixing system for electronic and/or electrical components, referred to as E-components for short, such as chips, circuits, transponders, cables, etc. At least one first fastening element with individual closure parts interacts with the corresponding closure parts of another fastening element to form an adhesive closure which can be repeatedly opened and closed. The respective E-component can be connected to a support. The invention furthermore relates to a fastening element which can be used for the fixing system.

BACKGROUND OF THE INVENTION

EP 0813 277 A2 discloses a precabled lining part for the interior lining of a motor vehicle. The prior art lining part is made such that its precabling is facilitated and is accompanied by reduced cost. The cable strand can be uninstalled in the easiest way possible. For this purpose, the lining part along the electrical cable strand to be mounted has a Kletten® Velcro-type closure strip or Kletten® Velcro-type closure strip sections spaced apart from one another for the cable strand. The electrical cable strand is provided with a jacket or collars located at a distance, made of the corresponding closure material—whether in the form of a hook or loop material—for forming a detachable adhesive closure connection with the Kletten® Velcro-type strip or Kletten® Velcro-type strip sections. Jacketing the cable strand with the indicated Kletten® Velcro-type strip elements is accordingly time-consuming, and therefore, expensive.

WO 03/002377 A2 discloses a fixing system for use in motor vehicles with a vehicle housing. At least one part of the housing inside surface, such as in the form of the headliner, is covered by a cover plate of electrical or electronic articles, such as cables, elastic printed circuits, elastic flat cables or antivibration inserts, referred to as E-components for short, inserted between the cover plate and the housing. Male interlocking parts are provided as the first fastening element, in particular in the form of closure hooks, and are assigned to the articles and/or the vehicle housing to enable their attachment to the plate. For this purpose, the cover plate on one of its sides comprises a looped fabric as corresponding closure parts of another fastening element with a base and with loops projecting out of the base. This looped fabric covers essentially the entire surface of the cover plate to form an adhesive closure which can be repeatedly opened and closed and which makes it possible to detachably connect the indicated E-components to the vehicle housing parts, such as the headliner or the like, in a defined manner, and to fix them there.

In a development of the known solution, in a modified embodiment it is also possible to use an elastic flat cable with the respective support as the base Electrical circuits are applied on the support, in particular by etching or printing, at least one of the surfaces of the support and preferably on each surface of the support a strip being attached, in particular cemented, from which the interlocking elements project as closure parts of the fastening elements used.

The initially mentioned solution in some instances can only be mounted with difficulty. The second solution entails the risk of leading to a functional structure projecting far from the vehicle housing part due to the laminated multiple arrangement of closure parts. This might lead to problems with later attachment of covering parts such as a headliner.

SUMMARY OF THE INVENTION

An object of the invention is to provide an improved fixing system where the fastening element is formed for electronic and/or electrical components, referred to as E-components for short, and requires less space, is reliable to use, and involves low production and installation costs.

This object is basically achieved by a fixing system and a fastening element requiring only little installation space. The other fastening element can be connected to the support having at least in part a cement layer and/or having an embedding mass producing the direct linkage of the respective E-component to the respective other fastening element. In particular, the E-components project with only a small protrusion from the corresponding closure parts so that, for example, with the fixing system according to the invention, the E-components can be fixed in part even without any projections on the vehicle housing parts such as the headliner or the like. Since the cement layer used and/or the embedding mass can be economically produced, the production costs for the entire system can be rated as low. Since the respective E-component can be fixed on the cement layer and/or the embedding mass before the actual fixing process, the installation process is facilitated. In particular, with the fixing system according to the invention, freedom in the routing of E-components can be largely achieved. This freedom is a major factor, particularly when using cables or cable strands.

The fastening element can be used as an independent, installable unit for the fixing system according to the invention. The unit has a suitable closure part, preferably in the form of a flat adhesive closure material, with individual projecting closure elements which are used as supports for electronic and/or electrical components, referred to as E-components for short. The pertinent linkage is implemented by the corresponding cement layer or an embedding mass. A fastening element equipped with the respective E-component can be produced elsewhere and then kept "just in time" on the respective vehicle production line for immediate installation.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale:

FIG. 2 is a top perspective view of the lower fastening element, as viewed in FIG. 1, with the fixed cable strand;

DETAILED DESCRIPTION OF THE INVENTION

Figure 1:
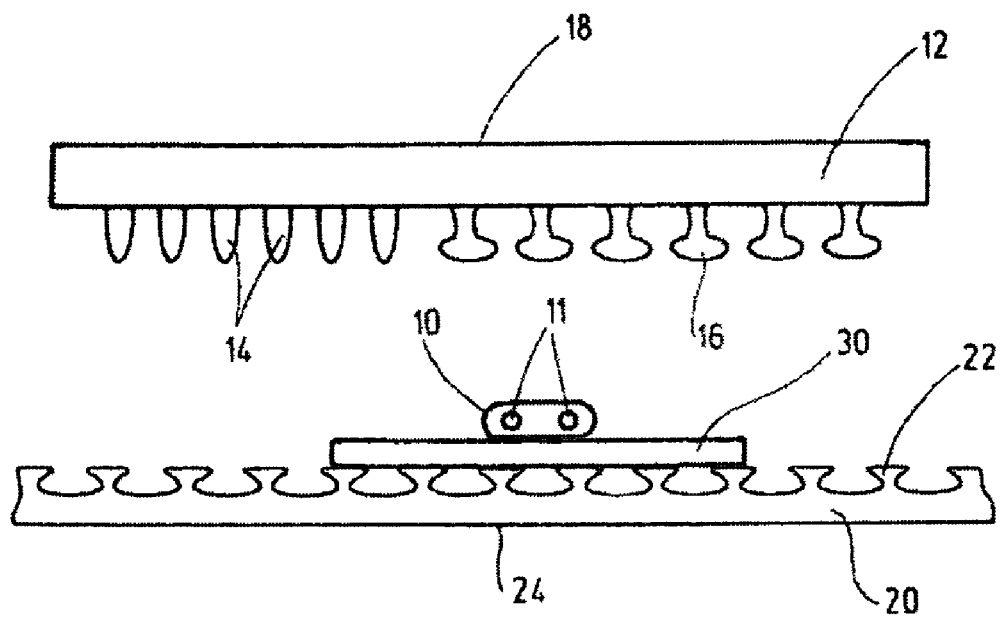
FIG. 1 is a side elevational view of a fixing system in an opened position according to a first exemplary embodiment of the present invention.

FIG. 1 shows in a schematic illustration of one embodiment of a fixing system according to the invention for electronic and/or electrical components, referred to as E-components for short, such as chips, circuits, transponders, cables, etc. The fixing options are explained below using the installation of a flat ribbon cable 10 with two electrical line strands 11 routed therein. Instead of the flat ribbon cable 10, other aforementioned E-components (not shown) are possible. The fixing system has a first fastening element 12 with individual closure parts or interlocking elements in the form of interlocking loops 14 or interlocking hooks 16 in a mushroom form. The indicated closure parts 14, 16 can occur mixed; but use of only one closure part is preferred. The first fastening element 12 can be fixed as a strip or flat element, for example, adhesively on the vehicle housing parts or body parts. For this purpose the fastening element 12 with its top side 18, as shown in FIG. 1, is adhesively fixed to the indicated housing parts. The use of the fixing system is not necessarily limited to motor vehicles. Applications in the areas of rail transport, aviation or shipping are conceivable. The potential uses of the illustrated fixing system are almost unlimited in this respect. In one especially preferred embodiment, the fixing system according to the invention can be used in the headliner region of a motor vehicle (not shown), in which the vehicle roof can be lined largely with the fastening element 12 from the interior of the vehicle. Before the actual headliner covering, that is, the interior vehicle roof, is put in place with its upholstery, it is necessary, relative to the requirements, to install E-components as outlined on the headliner to be invisible from the outside. The fixing system, which is still to be detailed, is especially preferably used for this purpose.

For support of the respective E-component, here in the form of the flat ribbon cable 10, this system has another or second fastening element 20 equipped with the corresponding closure parts 22 in mushroom form on a top side of its base element. The closure parts 22 can be connected with a capacity to be repeatedly opened and closed to the interlocking loops 14 or the mushroom-shaped interlocking elements 16 with the formation of a conventional Kletten® Velcro-type strip closure. The closure parts 22, made mushroom-like, loops (not shown), can also be used which then can be detachably joined to the interlocking elements 16 of the first fastening element 12. The bottom side 24 of the other fastening element 20 can then be joined to the preferably upholstered internal covering of the headliner in a fixed manner. When the adhesive closure is formed, the actual headliner is detachably connected to the roof body parts of the vehicle.

A support 30, in the embodiment as shown in FIG. 1, has a cement layer on both sides and in particular as a base support formed of a double-sided adhesive tape to fix the flat ribbon cable 10 on the top side of the support 30 as viewed in FIG. 1. The adhesive bottom side is used to interlock the support 30 on the face surface of the mushroom head-like closure parts 22 of the other fastening element 20.

This arrangement has the advantage that the support 30 which is made as adhesive tape can be easily fixed to the other fastening element 20, but can also be removed again from there. Furthermore, the flat ribbon cable 10 in the plane of the drawings can also be arranged to extend in curves along the support 30 designed to follow the curve of the flat ribbon cable 10. As shown by the top view in FIG. 2, the adhesive tape as the support 30 can be designed and can extend as a strip. A two-dimensional extension can also be provided to adhesively fix, for example, several E-components next to one another, such as flat ribbon cables 10. If the flat ribbon cable 10 should require additional ambient protection, for an embodiment (not shown) flat ribbon cable 10 can be held between two layers on adhesive tapes as the supports 30. If the two fastening elements 12, 20 are then routed toward one another, viewed in the direction of FIG. 1, the already described detachable Kletten® Velcro-type closure is implemented and the E-component is fixed accordingly.

The following embodiments are explained only to the extent that they differ essentially from the preceding first embodiment. In this respect, the aforementioned statements relating to the first embodiment also apply to the other embodiments. Furthermore, in the following embodiments the corresponding components of the fixing system are designated with the same reference numbers.

Figure 3:
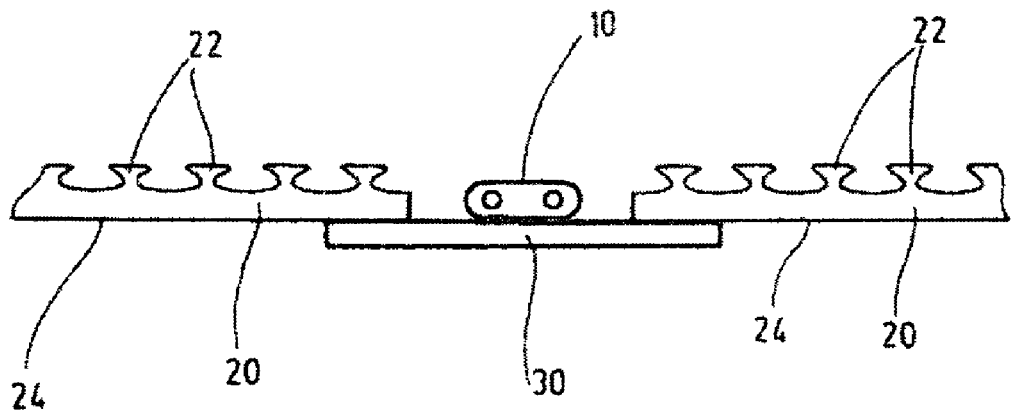
FIG. 3 is a side elevational view of a lower adhesive closure part of a fixing system according to a second embodiment of the present invention.

In the second embodiment of FIG. 3, two other identical fastening elements or sections 20 border one another with the formation of a definable distance. This distance is then bridged by the adhesive tape as the support 30. In this embodiment, support 30 needs to be provided with the adhesive layer only on its top side. In this respect, the support 30 on its top side bears the flat ribbon cable 10 and is connected adhesively to the bottom sides 24 of the other fastening elements 20 by engagement from underneath.

Figure 4:
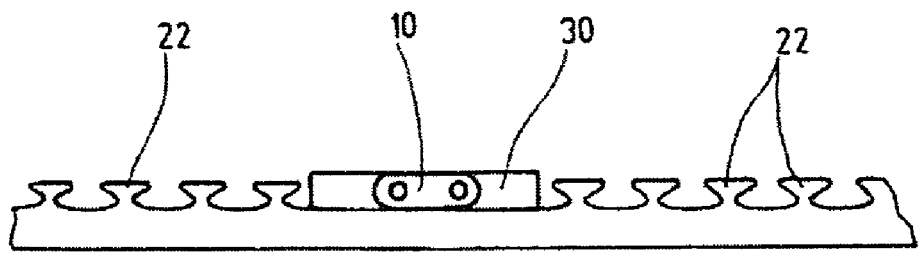
FIG. 4 is a side elevational view of a lower adhesive closure part of a fixing system according to a third embodiment of the present invention.

In the third embodiment in FIG. 4, the support 30 is now made as a cover mass integrating the flat ribbon cable 10. This embedding mass is in turn adhesively connected to the other fastening element 20 which for this purpose provides for spacing free of the mushroom-like closure parts 22. To achieve good linkage of the other fastening element 20 to the illustrated first fastening element 12, the overall height of the embedding mass is preferably selected such that it ends, to the greatest extent possible, with the face-side top side of the closure parts 22 without any protrusions. The embedding mass can be made such that it bears a separate cement layer as a fixed bed on its bottom side. In one preferred embodiment, the embedding mass itself is made adhesive as a whole.

Figure 5:
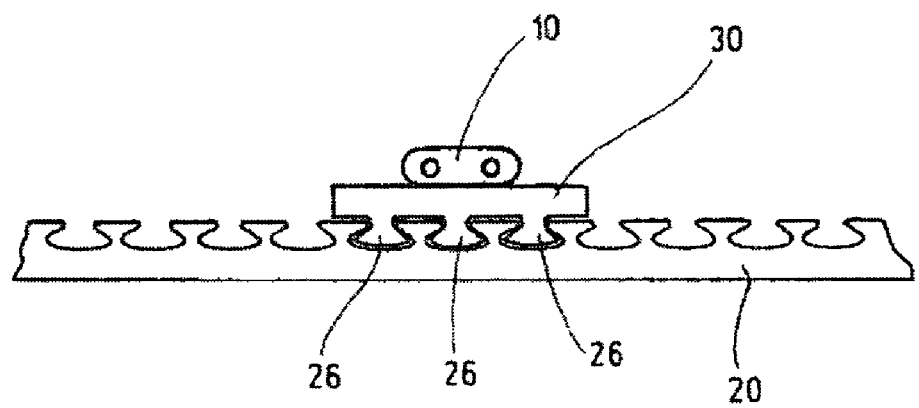
FIG. 5 is a side elevational view of a lower adhesive closure part of a fixing system according to a fourth embodiment of the present invention.

In a fourth embodiment of FIG. 5, the support 30 is an embedding mass having its bottom side, preferably integrally, other closure parts 26 corresponding to the mushroom-like closure parts 22 of the other fastening element 20, and can detachably intermesh with the intermediate spaces of closure parts 22. On the top side, the embedding mass is provided with an adhesive or is self-adhesive to fix the flat ribbon cable 10 on the other fastening element 20.

Figure 6:
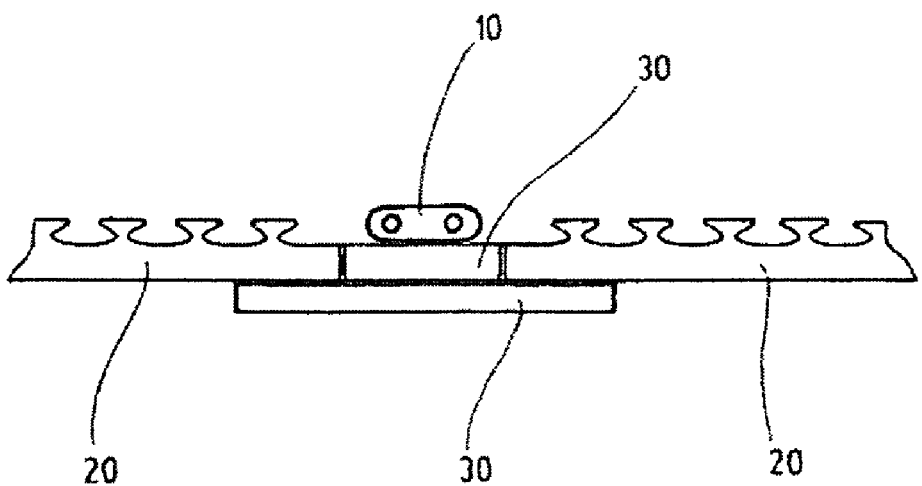
FIG. 6 is a side elevational view of a lower adhesive closure part of a fixing system according to a fifth embodiment of the present invention.

The fifth embodiment of FIG. 6 illustrates a combination of the ribbon-like support 30 with an adhesive layer and a supporting embedding mass for the flat ribbon cable 10. Similar to the embodiment of FIG. 3, the ribbon-like support 30 extends under the other adjacent fastening elements 20, and on its top side as the additional support 30 bears an embedding mass. The embedding mass carries the flat ribbon cable 10 on its top side. The installation dimensions can be chosen such that the flat ribbon cable 10 projects only with an optionally small amount of protrusion over the front faces of the closure heads or is held even without a protrusion.

The aforementioned statements make it clear that with the fixing system according to the present invention, a plurality of possible applications could be accommodated. For this reason, not all possible embodiments can be shown. Moreover, the above statements make it clear that in addition to the flat ribbon cable 10 other E-components (not shown) can be fixed on the fastening elements in this way or that these cable lines combined with other corresponding E-components can be fixed in this way.

The illustrated fastening elements 12, 20 can be produced, for example, by a shaping process as is shown in DE 100 39 937 A1. The known process is used to produce an adhesive closure part as a fastening element with a plurality of interlocking means made symmetrical and connected integrally to a closure support. The interlocking means can be closure parts in the form of a stem part provided with a head part. A moldable material is supplied to the shaping zone between a pressure tool and a molding tool. The tools are driven such that the closure support is formed in the shaping zone and is conveyed in one transport direction. The shaping element on the molding tool has mold cavities with the respective opposite boundary walls. Because, viewed at least on a longitudinal section of the respective mold cavity, the opposite boundary walls run continuously convexly, hyperboloid-like closure parts are formed with an extremely favorable closure characteristic with other closure parts for forming the adhesive closure. The peel strength values for the adhesive closure system can be further improved by the free head ends being made not round, but in the form of a polygon with n sides, for example, a hexagon (not shown), in contrast to FIG. 2.

The plastic materials to be processed and used for the fastening elements 12, 20 can be diverse, for example, in the form of polyamides or polyolefins, such as polypropylene or polyethylene (HDPL and LDPL). Other thermoplastics are also used, such as polyester, polyethylene terephthalate, polystyrenes, polycarbonates, polymethyl methacrylates, ethylene, vinyl acetate copolymers, including acrylate modified ethylenes, vinyl acetate polymers, and ethylene acrylic azide copolymers and polyethylene styrenes. Furthermore, the use of duroplastics is conceivable, as is the use of elastomers, such as naturally or synthetically producible styrene block copolymers with portions of isoprene, butadiene or ethylene (butylene) blocks. These elastomer materials are also especially well suited for forming the support 30 as an embedding mass and are referred to as hotmelt materials or hotmelts in the technical terminology.

There is fundamentally the possibility of use for metallocene-catalyzed polyolefin for polyurethane or polydiorganosiloxanes. To stiffen the support material for the fastening elements 12, 20, ductile thermoplastics can also be used, such as nylon or polyvinyl chloride.

The term "hotmelt" is a collective designation including both hotmelt adhesives and hotmelt coatings and sealing masses as well as embedding masses. The "hotmelts" used for the support 30 are characterized in that at normal temperature they form solid viscoelastic or viscoplastic bodies. In addition to the described elastomers, resins, waxes, thermoplastics, optionally with the addition of fillers, antioxidants, lubricants and the like can be used. When heated after passing through a thermoplastic region those materials can become viscous or thin liquid melts. Hotmelt adhesives which can be used may also include those based on an acrylate.

FIGS. 1 to 6 in this respect also relate to the fastening element 20 for the fixing system which as an installable unit, in addition to an electronic and/or electrical component, referred to as E-component for short, has an adhesive layer and/or embedding mass which produces the linkage of the respective E-component to the fastening element 20. The unit, which is marketable in this way, can be stored on site, for example, in a vehicle production line for later installation, for example, in the region of the headliner.

While various embodiments have been chosen to illustrate the invention, it will be understood by those skilled in the art that various changes and modifications can be made therein without departing from the scope of the invention as defined in the appended claims.

What is claimed is:

1. A fixing system for electrical and electronic components, comprising:
   a first fastening element with individual first closure parts;
   a second fastening element with individual second closure parts corresponding to and interactable with said first closure parts forming a repeatably openable and closable closure therewith; and
   a support connectable to an electrical or electronic component and connected to said second fastening element, said support having a double sided adhesive tape and having at least one of an adhesive layer and an embedding mass producing a direct linkage of the component to said second fastening element, said adhesive tape bearing the component on a first side thereof and being in face contact with said second closure parts on a second side thereof opposite said first side thereof.

2. A fixing system according to claim 1 wherein
   said support comprises said embedding mass with an adhesive layer bearing the component.

3. A fixing system according to claim 1 wherein
   said support comprises said embedding mass with the component at least partially integrated therein.

4. A fixing system according to claim 1 wherein said support has at least partially a hotmelt.

5. A fixing system according to claim 4 wherein said hotmelt is a hotmelt cement on said adhesive tape.

6. A fixing system according to claim 4 wherein said embedding mass is a hotmelt mass.

7. A fixing system according to claim 6 wherein said hotmelt mass comprises uncrosslinked thermoplastic material.

8. A fixing system according to claim 7 wherein said thermoplastic material is a synthetic rubber material.

9. A fixing system according to claim 1 wherein
   a plastic materials used therein are recyclable.

10. A fastening element according to claim 9 wherein
    said support comprises said embedding mass with an adhesive layer bearing the component.

11. A fastening element according to claim 9 wherein
    said support comprises said embedding mass with the component at least partially integrated therein.

12. A fastening element installable as a unit in a fixing system for electrical and electronic components, comprising:
    a base element with individual closure parts corresponding to and interactable with closure parts of another fastening element forming a repeatably openable and closable closure therewith, said base element including first and second sections spaced by a distance to border a channel therebetween, each of said sections having a back surface opposite a front surface from which said closure parts of said base element extend; and
    a support connectable to an electrical or electronic component and connected to said base element, said support having a double-sided adhesive tape and having at least one of an adhesive layer and an embedding mass producing a direct linkage of the component to said base element, said adhesive tape bearing the component on a first side thereof, said first side of said adhesive tape engaging and adhering to said back surfaces of said sections with the component being in said channel.

13. A fixing system for electrical and electronic components, comprising:
a first fastening element with individual first closure parts;
a second fastening element with individual second closure parts corresponding to and interactable with said first closure parts forming a repeatably openable and closable closure therewith, said second fastening element including first and second sections spaced by a distance to border a channel therebetween, each of said sections having a back surface opposite a front surface from which said second closure parts extend; and
a support connectable to an electrical or electronic component and connected to said second fastening element, said support having a double sided adhesive tape and having at least one of an adhesive layer and an embedding mass producing a direct linkage of the component to said second fastening element, said adhesive tape bearing the component on a first side thereof, said first side of said adhesive tape engaging and adhering to said back surfaces of said sections with the component being in said channel.

14. A fixing system according to claim 13 wherein said support comprises said embedding mass with an adhesive layer bearing the component.

15. A fixing system according to claim 13 wherein said support comprises said embedding mass with the component at least partially integrated therein.

16. A fixing system for electrical and electronic components, comprising:
a first fastening element with individual first closure parts;
a second fastening element with individual second closure parts corresponding to and interactable with said first closure parts forming a repeatably openable and closable closure therewith; and
a support connectable to an electrical or electronic component and connected to said second fastening element, said support having an embedding mass with an adhesive layer bearing the component producing a direct linkage of the component to said second fastening element, said embedding means having a side facing said second fastening elements with closure parts extending integrally therefrom and corresponding to and engagable with said second closure parts.

17. A fixing system for electrical and electronic components, comprising:
a first fastening element with individual first closure parts;
a second fastening element with individual second closure parts corresponding to and interactable with said first closure parts forming a repeatably openable and closable closure therewith; and
a support connectable to an electrical or electronic component and connected to said second fastening element, said support having an embedding mass with the component at least partially integrated therein producing a direct linkage of the component to said second fastening element, said embedding means having a side facing said second fastening elements with closure parts extending integrally therefrom and corresponding to and engagable with said second closure parts.

18. A fixing system for electrical and electronic components, comprising:
a first fastening element with individual first closure parts;
a second fastening element with individual second closure parts corresponding to and interactable with said first closure parts forming a repeatably openable and closable closure therewith; and
a support connectable to an electrical or electronic component and connected to said second fastening element, said support having at least one of an adhesive layer and an embedding mass producing a direct linkage of the component to said second fastening element, said support having at least partially a hotmelt.

19. A fixing system according to claim 18 wherein said support consists completely of a hotmelt.

20. A fixing system according to claim 18 wherein said hotmelt is a hotmelt cement on an adhesive tape.

21. A fixing system according to claim 18 wherein said embedding mass is a hotmelt mass.

22. A fixing system according to claim 21 wherein said hotmelt mass comprises uncrosslinked thermoplastic material.

23. A fixing system according to claim 22 wherein said thermoplastic material is a synthetic rubber material.

* * * * *